July 8, 1969  C. L. SANDSTROM ET AL  3,453,837
DEFROST CONTROL APPARATUS
Filed Nov. 9, 1967
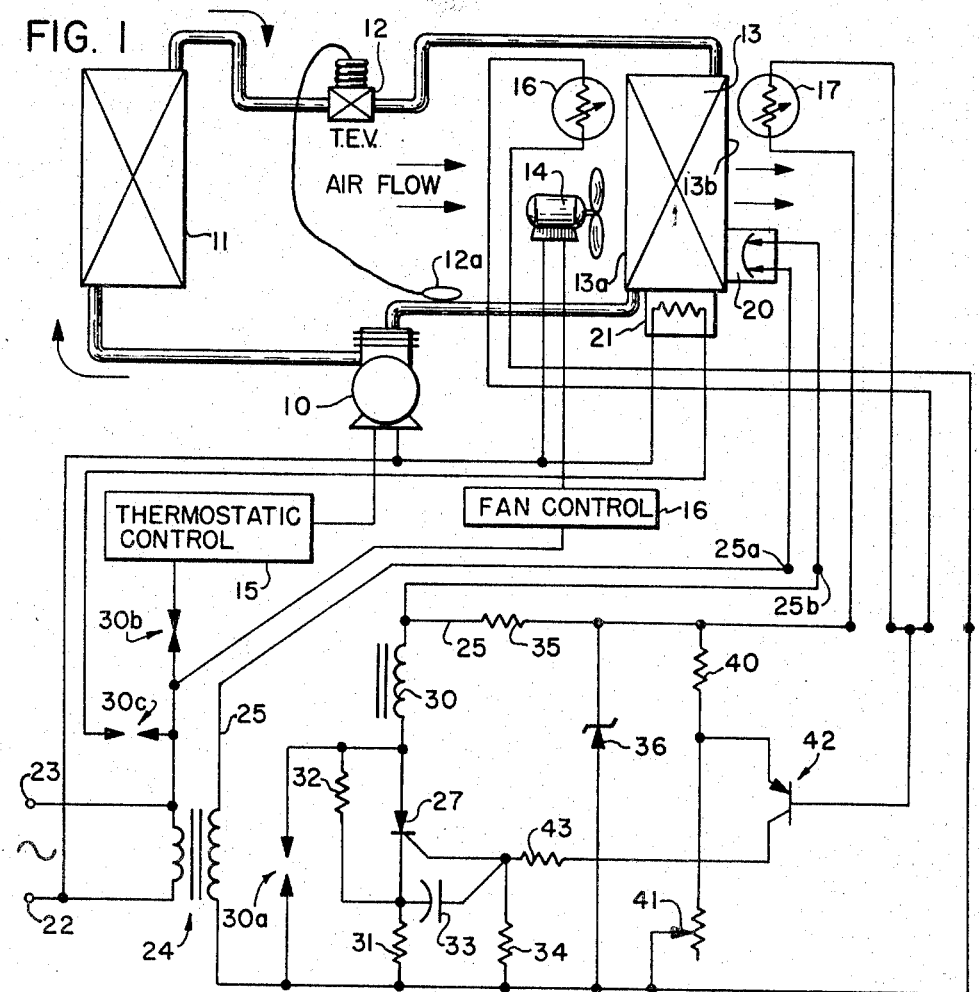
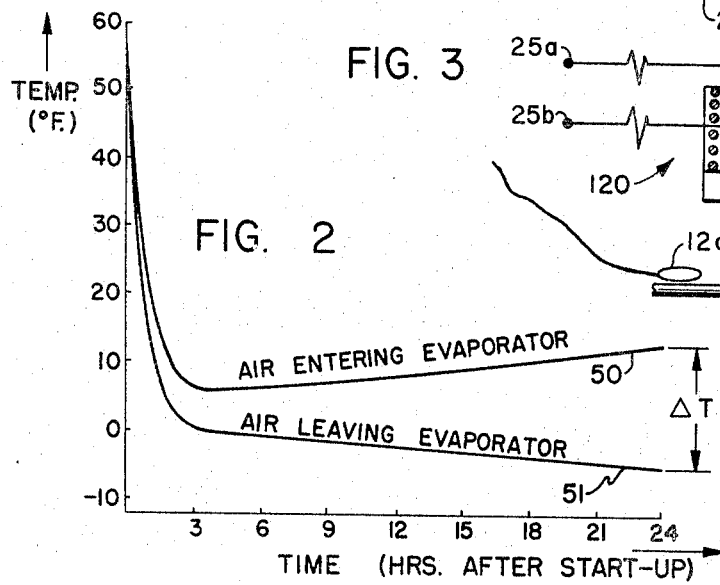
*INVENTOR.*
CLIFFORD L. SANDSTROM
YOUN H. TING
BY Donald R. Gostrom
ATTORNEY.

United States Patent Office 3,453,837
Patented July 8, 1969

3,453,837
DEFROST CONTROL APPARATUS
Clifford L. Sandstrom and Youn H. Ting, Bloomington,
Minn., assignors to Honeywell Inc., Minneapolis, Minn.,
a corporation of Delaware
Filed Nov. 9, 1967, Ser. No. 681,774
Int. Cl. F25d 21/06, 21/02
U.S. Cl. 62—140                                        13 Claims

ABSTRACT OF THE DISCLOSURE

A refrigeration apparatus with forced air flow across an evaporator and with a defrost control to interrupt the operation of the refrigeration apparatus and to energize a defrost apparatus when the evaporator becomes frosted. A pair of thermistors are mounted so that one senses the temperature of air entering the evaporator and the other senses the temperature of air leaving and these thermistors are connected in a bridge circuit the output of which controls a switching apparatus which in turn controls the energization of the refrigeration and defrost apparatus.

Background of the invention

The present invention provides a control system for automatically defrosting the cooling coil of a refrigeration apparatus only when the coil actually needs defrosting and which automatically terminates the defrost cycle when the coil is free of frost. This type of system finds particular application in commercial refrigeration equipment. In the past, many types of automatic defrost controls have been proposed and many have actually been utilized. Probably the most common is a control whereby the refrigeration apparatus is automatically defrosted on a periodic basis under the control of a simple timer. This has the obvious disadvantage that the control must be set to defrost often enough so that it can handle the most adverse conditions. As a consequence, often a defrost cycle may be initiated when there really is no need for it. Defrosting raises the temperature in the refrigerated area and this may adversely affect the product being refrigerated. Therefore, it is extremely desirable that the defrosting takes place only when it is essential.

In an attempt to provide demand defrost systems, many variables have been utilized to initiate defrost. These include simply the measurement of the temperature in the refrigerated area, measurement of the coil temperature, measurement of the air temperature in an area where entering air will be deflected back from the coil when the coil is partially frosted, measurement of pressure drop across the coil, the use of hot wire anemometer type sensors utilizing a control sensor and one which is responsive to the amount of air passing through the evaporator to provide a differential signal, and many other approaches. Some of these schemes required modification of the refrigerating apparatus, some were adversely affected by changes in load and in ambient and some subject to malfunction as by the blocking of a control or sample air passage or the like.

There has long been a need for a demand defrost control apparatus which is relatively simple and yet reliable, which is relatively free from effect by ambient changes, changes in load and the like, and which is quite readily adaptable to various types of refrigerating apparatus.

Brief summary of the invention

This invention provides an improved demand defrost control apparatus wherein a first temperature responsive means is utilized so that it responds to the temperature of air entering the cooling coil while a second temperature responsive means is utilized to respond to the temperature of air leaving the coil. These temperature sensors are utilized as part of a control means which controls operation of the defrost means in response to the temperature differential between the first and second temperature responsive means. In a preferred arrangement means responsive to a condition indicative of the temperature of the coil itself is operable to terminate the operation of the defrost means when the coil temperature reaches a predetermined maximum and also renders the control means inoperative so that the system cannot initiate a further defrost cycle (as might occur in response to transient conditions immediately following a defrost cycle) until the coil temperature has dropped to a predetermined temperature between the maximum temperature and the normal coil operating temperature, at which predetermined temperature the transient conditions should have substantially ceased.

Description of the drawing

FIGURE 1 is a schematic showing of a refrigeration system utilizing the defrost control apparatus of this invention; FIGURE 2 is a time-temperature graph showing the temperature of air entering and leaving the evaporator of the refrigerating apparatus over a period of time; and FIGURE 3 is a fragmentary schematic view disclosing a modification to the system of FIGURE 1.

Detailed description of preferred embodiment

Referring to FIGURE 1, the refrigeration system includes a compressor 10, a condenser 11, a thermostatic expansion valve 12 with a sensing bulb 12a and an evaporator 13 connected in the usual relationship. This particular system is shown by way of example and it is to be understood that the defrost control apparatus to be described hereinafter is also applicable to absorption type apparatus, to apparatus wherein a brine is circulated through a cooling coil, and the like. Therefore, evaporator 13 is symbolic of a cooling coil of some type which has an inlet end 13a and an outlet end 13b through which air passes. In like manner, the compressor, condenser and expansion valve are symbolic of the cooling means for cooling the coil. A fan 14 is operable to move air through the coil. Compressor 10 and fan 14 are connected by appropriate conductors to an electrical power source and are controlled by a thermostatic control 15 and a fan control 16, respectively. As will be seen hereinafter, thermostatic control 15 has connected in overriding controlling relationship therewith a relay contact which is operable by the defrost apparatus.

Mounted in a position so that it responds to the temperature of air entering the coil is a first temperature responsive means 16 which preferably takes the form of a negative temperature coefficient thermistor. A second temperature responsive means 17, which in the preferred form, is also an NTC thermistor, is disposed adjacent the outlet end of the evaporator and in a position so that it is responsive to the temperature of air leaving the evaporator. A condition responsive means 20 which in one preferred form is a snap disc type thermal switch, is disposed so that it senses the condition, (i.e. the temperature) of the cooling coil itself. When the thermal switch is used, it is essential that it be mounted sufficiently upstream of the sensor 12a for the thermostatic expansion valve so as to assure that sensor 20 senses saturated coil temperature. Associated with cooling coil 13 is a defrost heating apparatus shown schematically as a single heater 21. Obviously any number of heaters may be utilized in any desired arrangement, depending upon the size and construction of the cooling coil.

A pair of terminals 22 and 23 are adapted to be connected across a normal source of electrical power and thereby provide power to a transformer 24. Provision may also be made for the connection to these terminals by the circuits to compressor 10 and fan 14. Connected to opposite ends of the output winding of transformer 24 are a pair of conductors 25 and 26. Connected across conductors 25 and 26 is a load circuit including a silicon controlled rectifier 27 connected so as to conduct current in a direction from conductor 25 to conductor 26, and a relay coil 30 connected between conductor 25 and the anode of SCR 27. Connected between the cathode of SCR 27 and conductor 26 is a resistor 31 which, along with a resistor 32 which is connected in parallel with the SCR from anode to cathode, form a back bias network for the SCR. A normally open contact 30a of relay 30 is connected between the anode of SCR 27 and conductor 26, thereby paralleling the SCR and resistor 31. A transient suppression capacitor 33 is connected between the cathode and the gate of SCR 27 and a resistor 34 is connected between the gate of the SCR and the conductor 26. Relay 30 also has normally closed contact 30b connected between terminal 23 and the compressor and in series with control 15, and normally open contact 30c connected between terminal 23 and heater 21.

Also connected across conductors 25 and 26, through a dropping resistor 35, is a voltage clipping or regulating Zener diode 36. Connected across Zener diode 36 is a resistive bridge circuit which has thermistors 16 and 17 connected in two adjacent legs thereof and which has a fixed resistance 40 and an adjustable resistance 41 connected in the other two adjacent legs thereof. A PNP transistor 42 is connected across the output of the bridge with its base connected to a point intermediate thermistors 16 and 17 and with its emitter connected at a point intermediate resistors 40 and 41. The collector of transistor 42 is connected, through a resistor 43, to the gate of SCR 27. Thermal switch 20 is connected, by terminals 25a and 25b, into conductor 25 so as to be in controlling relationship with both the load circuit and the bridge circuit.

The operation of the system can best be understood by referring to FIGURE 2 which shows a typical cycle of a refrigeration system utilizing the defrost control apparatus disclosed in FIGURE 1. In FIGURE 2 numeral 50 refers to a curve showing the temperature of air entering the evaporator and numeral 51 refers to a curve indicating the temperature leaving the evaporator. Under normal operating conditions in a commercial application, a defrost cycle may be required after approximately 24 hours of operation. As indicated in the graph, the temperatures drop rapidly at the beginning of the refrigeration cycle and ultimately reach the equilibrium conditions at which the temperature of the air entering the evaporator may be approximately 4 or 5 degrees warmer than the temperature of the air leaving. As frost begins to accumulate on the evaporator coil, the temperature of the coil and the temperature of air leaving the coil gradually decreases. However, at the same time due to the frost build up the amount of air passing over this coil also decreases and consequently the temperature of the air entering the evaporator, that is the temperature in the refrigerator area, gradually rises. When the difference between the temperature sensed by thermistors 16 and 17 reaches a predetermined amount ($\Delta T$) the evaporator has become frosted sufficiently so that a defrost cycle should be initiated.

Adjustable resistor 41 is adjusted to balance the bridge circuit whenever the temperature differential between thermistors 16 and 17 is below the preselected $\Delta T$. As the temperature at thermistor 17 drops, the resistance therein increases and at the same time the temperature at thermistor 16 increases, causing the resistance of thermistor 16 to decrease. At the preselected point, the base of transistor 42 becomes sufficiently negative with respect to the emitter to render the transistor conductive. This provides an output voltage developed across resistor 34 which is applied to the gate of SCR 27 firing the SCR to provide a sufficient current flow through the coil of relay 30 to operatively energize it and to operate its relay contacts. It should be noted that a certain amount of current flows through the relay coil and through resistors 32 and 31 even when the SCR is not conducting. This current is insufficient to operably energize the relay but applies a back bias, developed across resistor 31, to the SCR. The back bias voltage developed across resistor 31 and the forward bias voltage developed across resistor 34 are applied in series opposition between the cathode and gate of SCR 27 during each half cycle during which DC is applied as a forward bias. The combined voltage rises until it reaches the point at which the DC is clipped by the Zener diode and at that point it gradually decreases until near the end of that half cycle at which time it again increases and then drops off to zero. This arrangement insures that the SCR fires only during a portion of the cycle when there is sufficient current to fully energize the relay, namely during the initial portion of a cycle. This back biasing arrangement has been described only briefly herein since it really forms no part of the present invention. An arrangement of this type is described in more detail in the copending application of Arlon D. Kompelien, Ser. No. 613,903, filed Feb. 3, 1967, now Patent 3,380,796.

When relay 30 is energized, normally open contacts 30a are closed providing a holding circuit around the SCR so that the relay is maintained energized so long as snap disc 20 maintains its contacts closed. At the same time, normally closed contacts 30b are opened, breaking the circuit to the compressor and thus discontinuing the operation of the refrigeration apparatus, and normally open contacts 30c are closed, completing the circuit to defrost heater 21. The defrost heater then operates until temperature sensor 20 opens its contacts. Temperature sensor 20 is chosen so as to have a relatively large differential. In a preferred arrangement, the snap disc was chosen so that its contacts opened at 55° F. and closed again at 35° F. Thus, the compressor remains de-energized and the heater energized until sensor 20 senses a temperature of 55° at the evaporator. At this time the sensor opens its contacts breaking the circuit to the coil of relay 30 and also breaking the circuit to the bridge circuit so that it is impossible to initiate another defrost cycle so long as the contacts of sensor 20 are open.

As soon as relay 30 is de-energized, the holding contacts 30a open as do contacts 30c, de-energizing the heater. Contacts 30b close and, since thermostatic control 15 will be calling for cooling, compressor 10 is energized and, in a very short time, coil 13 begins to cool. During this period, various transients may be present in the cooling coil and, if thermistors 16 and 17 were operable to control the defrost apparatus, they might deliver a false signal and actually initiate another defrost cycle before the evaporator reached its normal operating temperature. The possibility of this occurring is completely eliminated by the opening of the circuit to both the load circuit and the bridge circuit during the initial period of compressor operation after the defrost cycle. Only when the temperature of the evaporator is dropped to the second predetermined temperature, such as 35° F., the contacts of sensor 20 close so that power is again applied to the bridge circuit and it is placed in controlling relationship with the load circuit.

FIGURE 3 shows another embodiment of the invention applicable to systems such as that disclosed wherein the pressure of the cooling fluid in the coil is indicative of the average coil temperature. Here a pressure switch 120 is substituted for thermal switch 20 to terminate the defrost cycle. Pressure switch 120 is connected by appropriate piping 120a to the cooling coil or suction line (which have substantially the same pressure) so that a pair of electrical contacts 120b, connected across terminals 25a and 25b, are operated in response to the pressure of the refrigerant in the coil or suction line. As is well known, in a refrigeration system of the type shown in FIGURE 1, the coil or suction pressure is directly related to the average coil temperature with this pressure increasing as the temperature increases. Pressure switch 120 is constructed so that under normal operating pressures contacts 120b are closed and so that only at a pressure corresponding to a coil temperature at which all of the frost should be melted from the coil (such as 55° F.) are the contacts opened. Pressure switch 120 is further constructed so that it has an operating differential sufficiently large so that once the contacts are opened, they remain open until the pressure has dropped to a level which corresponds to a coil temperature obtained only after the transient period which occurs when the refrigerating apparatus is first placed in operation.

The operation of the system with the pressure switch 120 is identical to that of the system of FIGURE 1 as described above. As noted, the coil pressure and suction pressure of the refrigerant are substantially the same. In many instances it will be desirable to connect the pressure switch into the suction line (as shown in FIGURE 3); in other instances it may be connected directly to the coil. The important consideration is that the switch be operated by pressure which is indicative of the temperature of the coil. The reference to "coil pressure," "refrigerant pressure in the coil," and the like herein is intended to include refrigerant pressure at any point in the system which always has substantially the same pressure as the coil or is otherwise directly indicative of coil temperature.

It will be observed that there is no need for ambient temperature compensation since the thermistors are in adjacent legs of the bridge circuit and varying ambients will offset each other. It should also be observed that together the relay and the SCR comprise what may be referred to as a switching means controlling a defrost apparatus. It should also be pointed out that the defrost apparatus need not be an electric heater but rather could be a hot gas type defrost with appropriate controls or some other type of arrangement which causes the temperature of the coil to rise and melt the frost therefrom. Therefore, as used herein, the term "defrost means" may include any of these arrangements.

Two embodiments of the invention have been disclosed for purposes of illustration. Various modifications, in addition to those pointed out above, may be apparent to those skilled in the art in view of the disclosure herein. Therefore, it is intended that the invention be limited solely by the scope of the appended claims.

The embodiments of the invention in which an exclusive property or right is claimed are defined as follows:

1. Apparatus for controlling the defrosting of the cooling coil of a refrigeration apparatus which includes means for moving air across the coil from an inlet to an outlet, cooling means for cooling the coil, and defrost means operable to increase the temperature of the coil to melt the frost therefrom, the control apparatus comprising: first temperature responsive means adapted to be mounted in a position so that it will be responsive to the temperature of air entering the coil; second temperature responsive means adapted to be mounted in a position so that it will be responsive to the temperature of air leaving the coil; control means adapted to be connected in controlling relationship with the defrost means, means connecting said first and second temperature responsive means to said control means to be responsive to a predetermined difference in the temperatures at said first and second temperature responsive means to operate said control means to render the defrost means operative.

2. The apparatus of claim 1 wherein: said control means includes first control means adapted to be connected to the defrost means and second control means including said first and second temperature responsive means and operably connected to said first control means, said first control means is operable between a first control condition to render the defrost means inoperative, and a second control condition to render the defrost means operative; and said first control means normally is in said first control condition and is operated to said second control condition by said second control means when the temperature difference at said first and second temperature responsive means reaches a predetermined maximum indicative of a frosted condition of the coil.

3. The apparatus of claim 2 further including condition responsive means adapted to be mounted in a position so that it will be responsive to a condition indicative of the temperature of the cooling coil; and means connecting said condition responsive means in controlling relationship with said control means, said condition responsive means being responsive to a condition corresponding to a predetermined maximum coil temperature to operate said first control means to its said first control condition and to interrupt the control of said first control means by said second control means, said condition responsive to means being responsive to a condition corresponding to a second predetermined temperature, lower than said predetermined maximum temperature and greater than the normal operating temperature of the coil, to re-establish the control of said first control means by said second control means.

4. The apparatus of claim 3 wherein: said first and second temperature responsive means are temperature responsive resistors; said second control means includes a bridge circuit having said temperature responsive resistors connected in two legs thereof and with an output dependent upon the temperature difference between said resistors; and said first control means includes switch means responsive to the output of said bridge and adapted to be connected in controlling relationship with said defrost means.

5. The apparatus of claim 3 wherein: said first control means includes semiconductor switch means controlling current flow through a load circuit adapted to be connected so that current flow therethrough renders the defrost means operative; said first and second temperature responsive means are temperature responsive resistors; said second control means includes a bridge circuit with said temperature responsive resistors in two legs thereof and with an electrical output dependent upon the difference in the electrical resistance of said temperature responsive resistors; and said second control means further includes circuit means connecting said bridge circuit and said semiconductor switch means so that said switch means is controlled by the output of said bridge circuit and is rendered conductive only in response to an output thereof which is indicative of a predetermined temperature difference at said temperature responsive resistors; said control means includes circuit means electrically connecting said load circuit and said bridge circuit and adapted to connect said load circuit and said bridge circuit to a source of power; and said condition responsive means includes switch means connected in the last named circuit means in controlling relationship with both load circuit and said bridge circuit.

6. The apparatus of claim 3 wherein: said second control means includes means providing an electrical output dependent upon the temperature difference between said first and second temperature responsive means; and said first control means includes semiconductor switch means operable in response to said output of said second control means and adapted to be connected in controlling relationship with said defrost means.

7. The apparatus of claim 6 wherein: said first and second temperature responsive means are temperature responsive resistors; said second control means includes a bridge circuit with said temperature responsive resistors connected in two legs thereof whereby the output of said bridge circuit is dependent upon the temperature difference between said temperature responsive resistors; and said semiconductor switch means is nonconductive in the first control condition and is rendered conductive in response to said output only when said output reaches a level corresponding to a predetermined temperature difference between said temperature responsive resistors which is indicative of a frosted cooling coil condition.

8. The apparatus of claim 7 wherein: said condition responsive means includes temperature responsive switch means connected in controlling relationship with said semiconductor switch means and normally operating in a current conducting condition in response to temperatures below said predetermined maximum temperature and operated to a current interrupting condition in response to temperature equal to or greater than said predetermined maximum temperature, said temperature responsive switch means having an operating differential whereby, when it is operated to said current interrupting condition, it returns to said current conducting condition only in response to said second predetermined temperature so that said semiconductor switch means is rendered nonconductive when said condition responsive means senses said predetermined maximum temperature and is maintained nonconductive, regardless of the temperature differential between said first and second temperature responsive means, until said condition responsive means again senses said second predetermined temperature.

9. The apparatus of claim 8 wherein: said condition responsive means includes pressure operated switch means responsive to refrigerant coil pressure and connected in controlling relationship with said semiconductor switch means and normally operating in a current conducting condition in response to coil pressures corresponding to coil temperatures below said predetermined maximum temperature and operated to a current interrupting condition in response to pressures corresponding to coil temperatures equal to or greater than said predetermined maximum temperature, said pressure switch means having an operating differential whereby, when it is operated to said current interrupting condition, it returns to said current conducting condition only in response to a pressure corresponding to said second predetermined temperature so that said semiconductor switch means is rendered nonconductive when said pressure switch means senses a pressure corresponding to said predetermined maximum temperature and is maintained nonconductive, regardless of the temperature differential between said first and second temperature responsive means, until said pressure switch means again senses a pressure corresponding to said second predetermined temperature.

10. In a refrigeration apparatus including a cooling coil having an air inlet and an air outlet, means for moving air across said coil, cooling apparatus for providing a cooling media to the coil, and defrost means operable to cause the temperature of the coil to increase to melt the frost therefrom the combination therewith of first temperature responsive means mounted adjacent the inlet to said coil and disposed so that it is responsive to the temperature of air entering said coil; second temperature responsive means mounted adjacent the outlet from said coil and disposed so that it is responsive to the temperature of air leaving said coil; and control means operably connected in controlling relationship with said defrost means, and means connecting said first and second temperature responsive means and to said control means whereby said control means is rendered operative thereby when a predetermined temperature difference exists between said first and second temperature responsive means to operate said defrost means to cause the temperature of said coil to increase.

11. The refrigeration apparatus of claim 10 wherein said control means comprises first and second control means operably connected, said first control means being connected to said defrost means and said second control means being connected to said first and second temperature responsive means, and further including means connected in controlling relationship with said control means and responsive to the existence of a first predetermined condition to render said de defrost means inoperative and to operably disconnect said control means from said defrost means and responsive to the existence of a second predetermined condition to operably re-connect said control means to said defrost means.

12. The refrigeration apparatus of claim 11 wherein the last named means includes third temperature responsive means mounted in thermal contact with said coil and responsive to the temperature thereof and said first predetermined condition constitutes a maximum temperature of said coil and said second predetermined condition constitutes a predetermined temperature of said coil which is lower than said maximum temperature thereof and greater than the normal operating temperature thereof.

13. The refrigeration apparatus of claim 11 wherein the last named means includes pressure responsive means connected to sense refrigerant pressure in said coil, and said firt predetermined condition constitutes a first refrigerant pressure corresponding to a maximum temperature of said coil and said second predetermined condition constitutes a second refrigerant pressure corresponding to a predetermined temperature of said coil which is lower than said maximum temperature thereof and greater than the normal operating temperature thereof.

References Cited

UNITED STATES PATENTS

| 2,988,896 | 6/1961 | Swart | 62—156 |
| 3,039,278 | 6/1962 | Thompson | 62—140 |
| 3,097,502 | 7/1963 | Krueger | 62—156 |
| 3,220,208 | 11/1965 | Oram | 62—140 |
| 3,363,429 | 1/1968 | Wechsler | 62—156 |

MEYER PERLIN, *Primary Examiner.*

U.S. Cl. X.R.

62—156, 209, 276